United States Patent [19]
Downey

[11] Patent Number: 6,032,210
[45] Date of Patent: Feb. 29, 2000

[54] METHOD FOR MAINTAINING BUS OWNERSHIP WHILE BUS MASTERING

[75] Inventor: Harold Downey, Tempe, Ariz.

[73] Assignee: VLSI Technology, Inc., San Jose, Calif.

[21] Appl. No.: 08/932,651

[22] Filed: Sep. 18, 1997

[51] Int. Cl.[7] .............................. G06F 13/42; G06F 13/14
[52] U.S. Cl. ......................... 710/105; 710/108; 710/129
[58] Field of Search ..................................... 395/285, 286, 395/280, 281, 823, 824, 825; 710/3, 4, 5, 100, 101, 105, 106, 108, 113, 119, 129, 200.11; 709/230

[56] References Cited

U.S. PATENT DOCUMENTS 5,392,407  2/1995  Heil et al. ............................... 710/113

OTHER PUBLICATIONS

PCI Local Bus, Specification, Revision 2.1, pp. 35–61, Jun. 11, 1995.

*Primary Examiner*—John A. Follansbee
*Attorney, Agent, or Firm*—Douglas L. Weller

[57] ABSTRACT

A method for transferring data is performed by a first input/output device in order to perform a data transaction with a host device. The first input/output device receives a first data transaction request from the host device. The first input/output device stops the first data transaction. The first input/output device then requests a data second transaction with a second input/output device and asserts a request signal. The first input output device continuously asserts the request signal even when receiving a stop signal from the second input/output device. The first input/output device retries the second data transaction with the second input/output while continuously asserting the request signal. Upon completing the second data transaction with the second input/output device, the first input/output device releases the request signal. The first input/output device then completes the data transfer with the host device.

20 Claims, 12 Drawing Sheets

METHOD FOR MAINTAINING BUS OWNERSHIP WHILE BUS MASTERING

BACKGROUND

The present invention concerns transfer of data over an input/output bus and pertains particularly to solving a problem which arises using the Peripheral Component Interconnect (PCI) bus protocol (as set out in PCI Specification Version 2.1) to retrieve data from a (adaptive) "DEVSEL" device.

When utilizing Peripheral Component Interconnect (PCI) bus protocol (as set out in PCI Specification Version 2.1), if a particular target device cannot complete a data transfer within a predetermined time, the target device asserts a PCI STOP signal. This causes the initiator device to retry the data transfer at a later time. The initiator relinquishes the bus and when granted the bus, the initiator device retries the data transaction.

While waiting for the initiator device to retry the data transfer, the target device can get ready for the data transfer in order to complete the retry within the predetermined try. If the target device is an adaptive "DEVSEL" device, this means that on a retry, the target device will more quickly assert the DEVSEL signal indicating it is ready for a data transfer. For example, a target device which is adaptive "DEVSEL" device, when initially being selected as a target for a data transfer, will assert the DEVSEL signal for four PCI clock cycles after receiving a FRAME# signal. On a retry, the same adaptive "DEVSEL" device will assert the DEVSEL signal for two PCI clock cycles after receiving a FRAME# signal.

An example of an adaptive "DEVSEL" device is a PCI-to-Industry Standard Architecture (ISA) bridge such as a Intel 82371SB PCI-to-ISA bridge, available from Intel Corporation, having a business address of 2200 Mission College Boulevard, Santa Clara, Calif. 95050.

While use of an adaptive "DEVSEL" can increase the performance of a target device, there is a certain corner case where the use of an adaptive "DEVSEL" has the potential to cause a data transfer error. The present invention solves this corner case.

SUMMARY OF THE INVENTION

In accordance with the preferred embodiment of the present invention, a method for transferring data is performed by a first input/output device in order to perform a data transaction with a host device. The first input/output device receives a first data transaction request from the host device. The first input/output device stops the first data transaction. The first input/output device then requests a data second transaction with a second input/output device and asserts a request signal. The first input output device continuously asserts the request signal even when receiving a stop signal from the second input/output device. The first input/output device retries the second data transaction with the second input/output while continuously asserting the request signal. Upon completing the second data transaction with the second input/output device, the first input/output device releases the request signal.

In the preferred embodiment of the present invention the host device, the first input/output device and the second input/output device communicate using a Peripheral Component Interconnect (PCI) bus protocol. The stop signal is a PCI STOP signal. The request signal is a PCI REQ signal. The first input/output device stops the first data transaction because the first input/output device and second input/output device have corresponding registers with a same bus address. This requires the first input/output device to meld data in corresponding registers before completing the first data transaction. The continuous assertion of the REQ signal is necessary to prevent the host from retrying the first data transaction before the second data transaction is completed. If the host were to retry the first data transaction before the second data transaction is completed, this could result in an error when the second input/output device is an adaptive "DEVSEL" device. The present invention prevents this error.

DESCRIPTION OF THE PREFERRED EMBODIMENT

Figure 1:
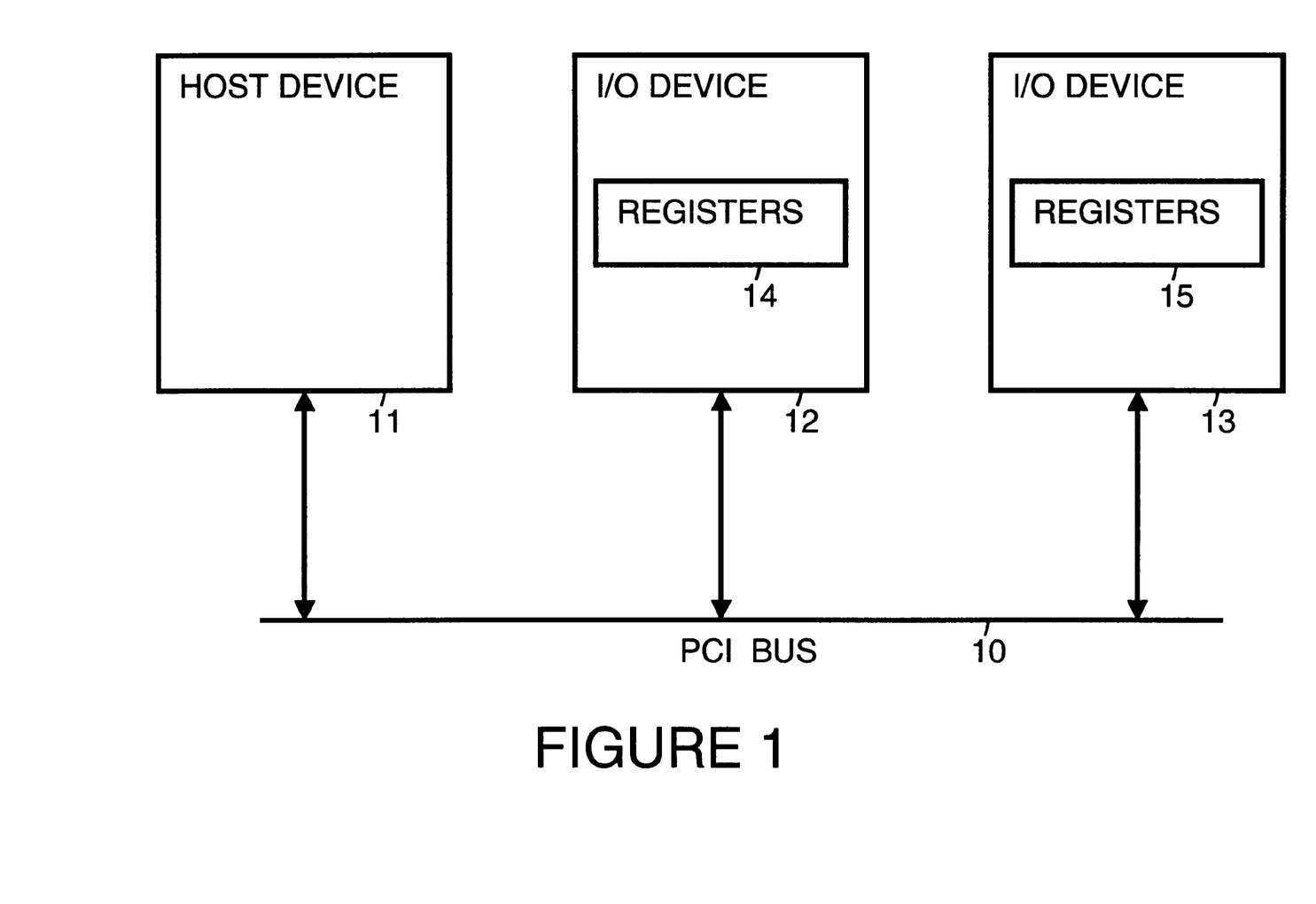
FIG. 1 is a simplified block diagram which shows a host device and two input/output (I/O) devices connected to a bus in accordance with the preferred embodiment of the present invention.

FIG. 1 is a simplified block diagram which shows a host device 11, an I/O device 12 and an I/O device 13 connected to a bus 10. For example, host device 11 is a system controller, I/O device 12 is an audio sound card and I/O device 13 is a ISA/PCI bridge. For example, the ISA/PCI bridge is an 82C371SB ISA/PCI bridge available from Intel Corporation. For example, bus 10 operates in accordance with the Peripheral Component Interconnect (PCI) bus protocol (as set out in PCI Specification Version 2.1). Registers 14 within I/O device 12 have the same bus address as a registers 15 within I/O device 13. Thus for an I/O read or an I/O write, to one of registers 14, I/O device 12 will initially respond to the I/O read or I/O write, but will also coordinate with I/O device 13 to assure that the correct data is transferred.

Figure 2:
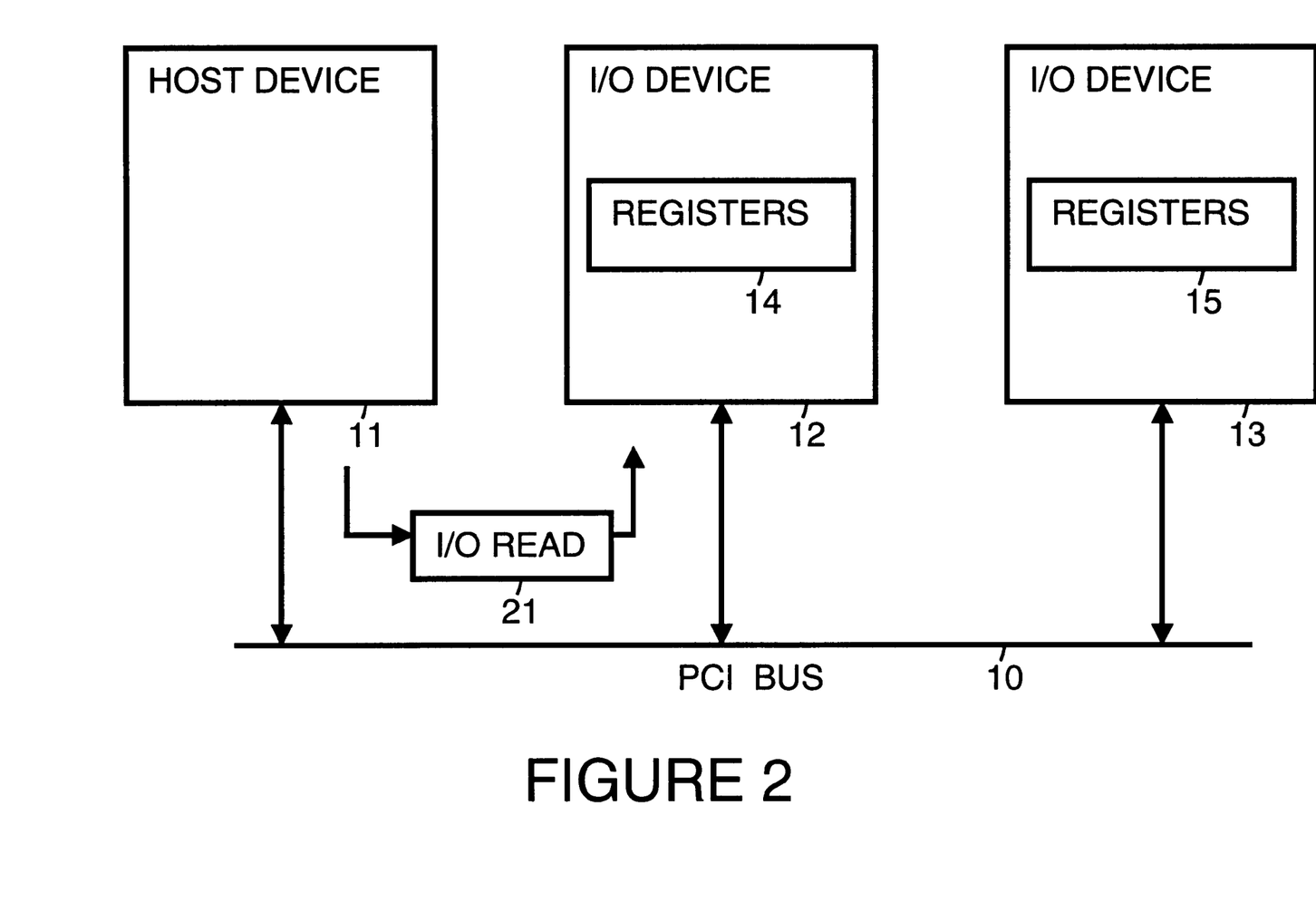
FIG. 2 is a simplified block diagram which illustrates the host device sending an I/O read to a first I/O device in accordance with the preferred embodiment of the present invention.

For example, FIG. 2 illustrates host device 11 initiating an I/O read 21 to a bus address that addresses a register within registers 14 and registers 15. I/O device 12 initially responds to I/O read 21 and assumes the role of target device for the transaction.

Figure 3:
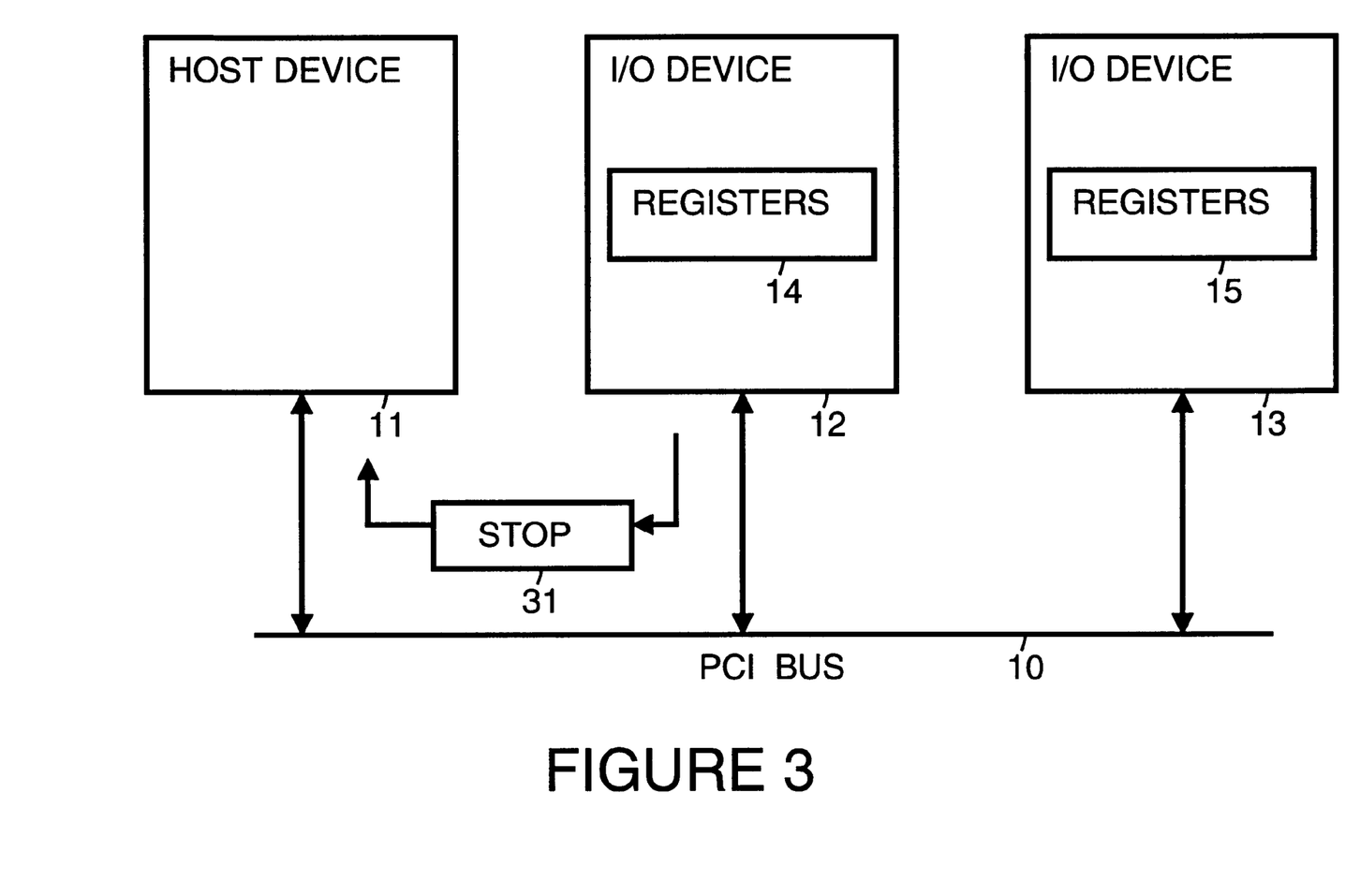
FIG. 3 is a simplified block diagram which illustrates the first I/O device sending a "STOP" signal to the host device in accordance with the preferred embodiment of the present invention.

As illustrated by FIG. 3, however, after initially responding to I/O read 21, I/O device 12 issues a "STOP" signal 31 to host device 11. This allows I/O device 12 time to obtain data from I/O device 13 in order to assure that correct data is sent to host device 11.

Figure 4:
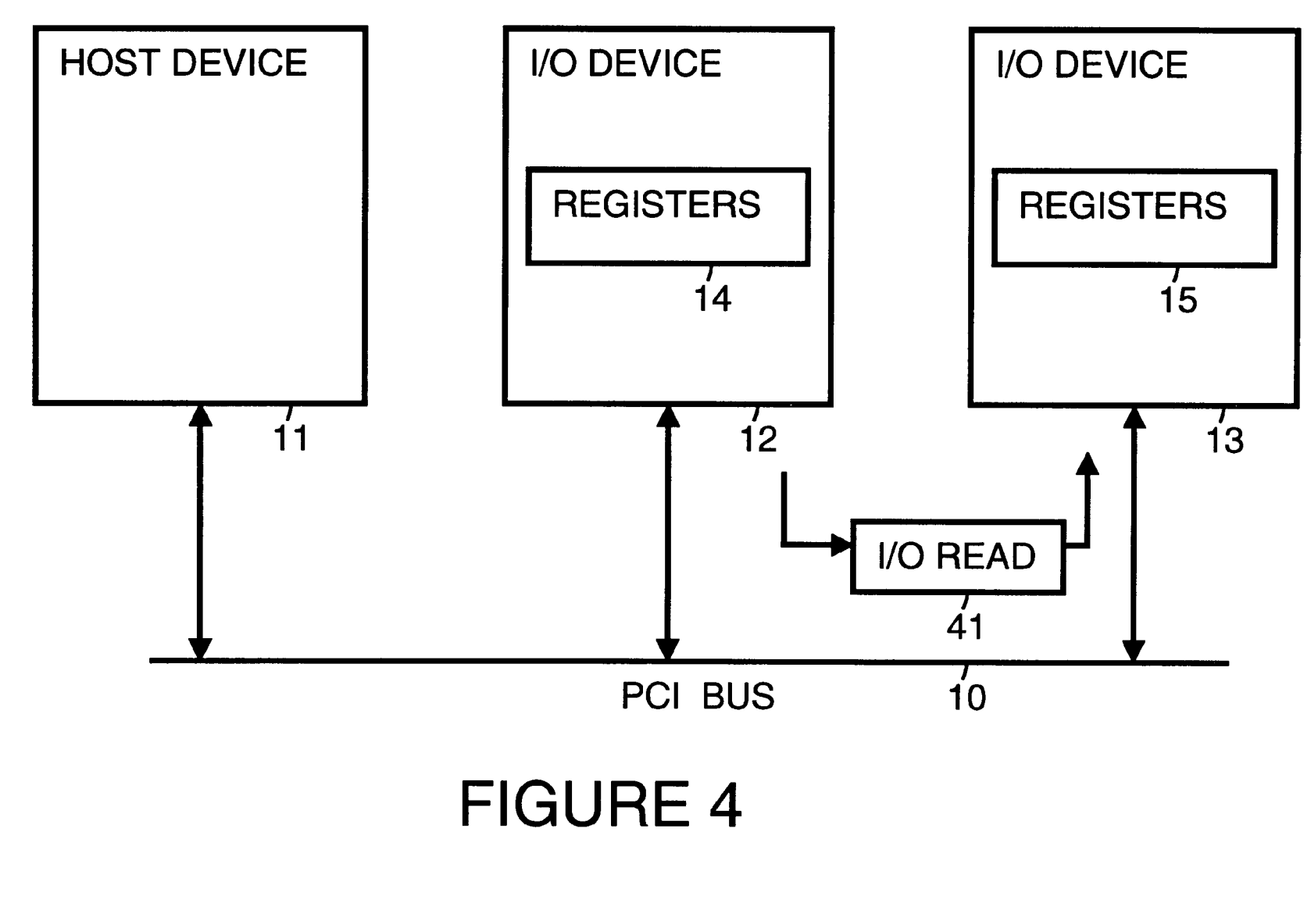
FIG. 4 is a simplified block diagram which illustrates the first I/O device sending an I/O Read to a second I/O device in accordance with the preferred embodiment of the present invention.

FIG. 4 illustrates I/O device 12 initiating an I/O read 41 to the same bus address as addressed by I/O read 21 (shown in FIG. 2). I/O device 13 responds to I/O read 41 and assumes the role of target device for the transaction.

Figure 5:
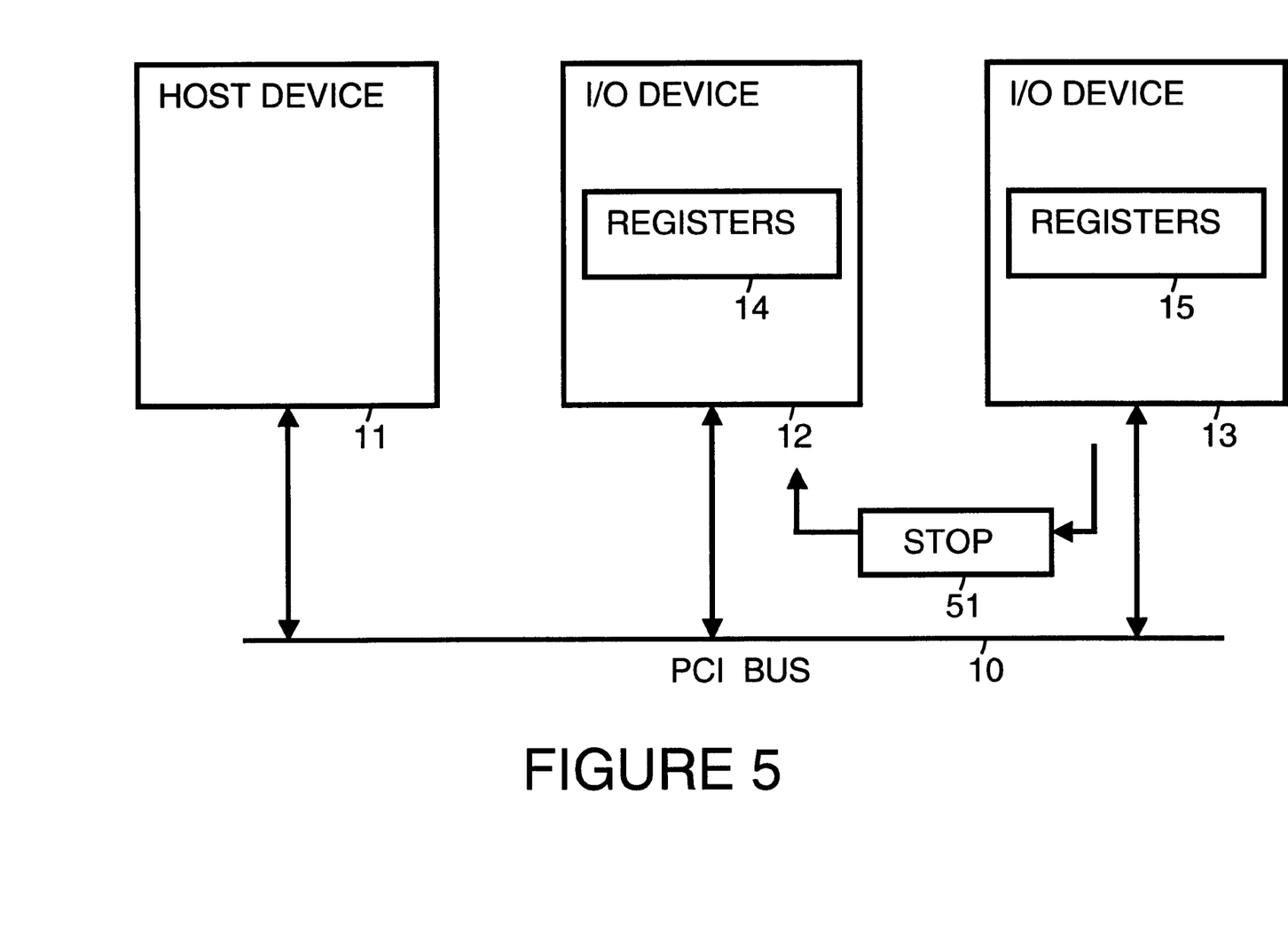
FIG. 5 is a simplified block diagram which illustrates the second I/O device sending a "STOP" signal to the first I/O device in accordance with the preferred embodiment of the present invention.

As illustrated by FIG. 5, however, after initially responding to I/O read 21, I/O device 13 is unable to obtain the data within the predetermined time of 16 PCI bus clock cycles and will issue a "STOP" signal 51 to I/O device 12 in accordance with the PCI Version 2.1 PCI Specification requirements. This allows I/O device 13 time to obtain the data in preparation for a retry from I/O device 12.

Figure 6:
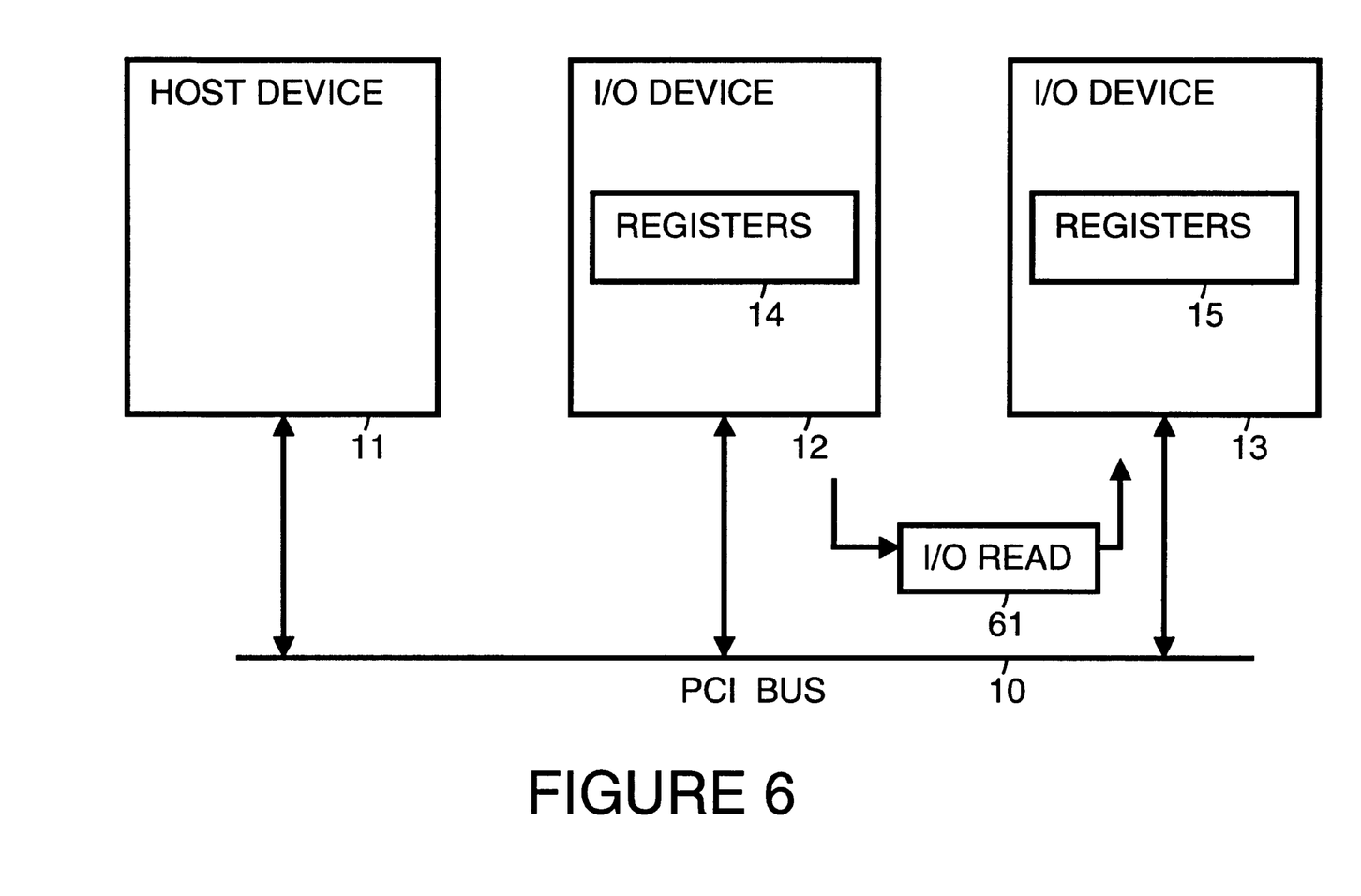
FIG. 6 is a simplified block diagram which illustrates the first I/O device retrying the I/O Read to the second I/O device in accordance with the preferred embodiment of the present invention.

FIG. 6 illustrates I/O device 12 retrying an I/O read 61 to I/O device 13. I/O device 13 responds to I/O read 61 and assumes the role of target device for the transaction. If I/O device 13 is an adaptive DEVSEL device, a retry by host 11 at this point can result in a transaction error. The preferred embodiment of the present invention avoids this transaction error as further described below.

Figure 7:
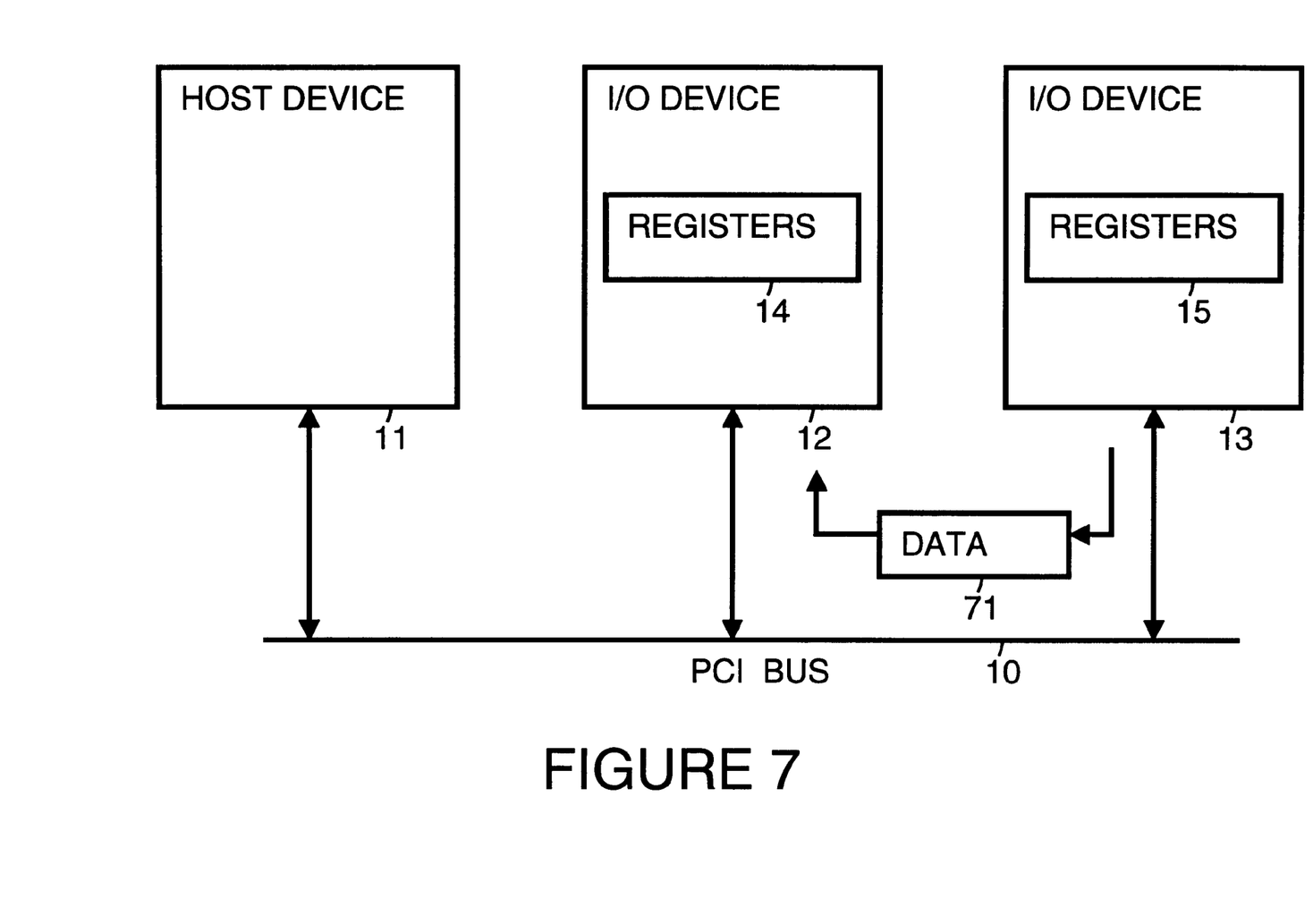
FIG. 7 is a simplified block diagram which illustrates the second I/O device sending data to the first I/O device in accordance with the preferred embodiment of the present invention.

As illustrated by FIG. 7, I/O device 13 sends data 71 as requested by I/O device 12. I/O device 12 uses this device to prepare the data originally requested by host 11.

Figure 8:
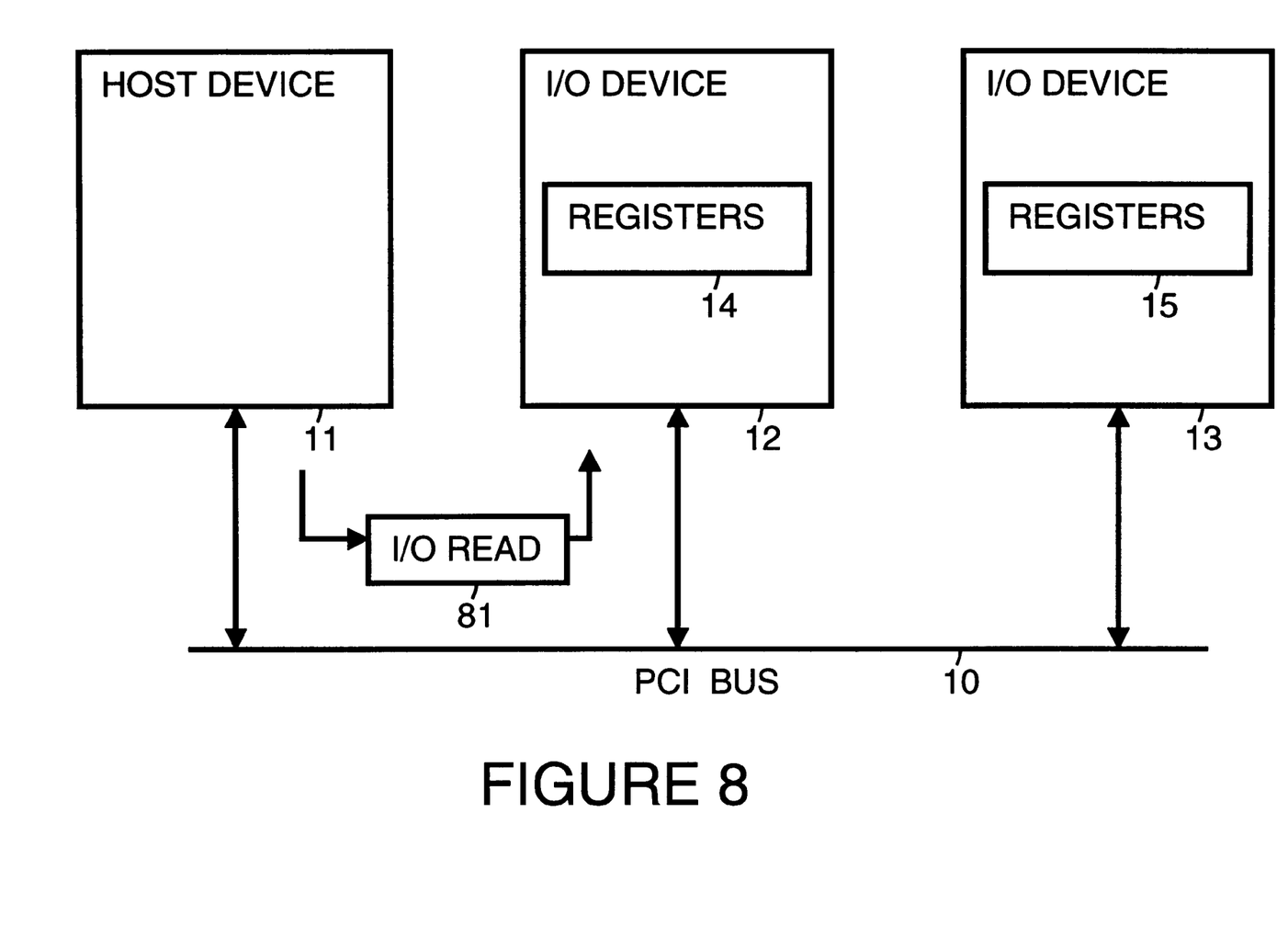
FIG. 8 is a simplified block diagram which illustrates the host device retrying the I/O Read to the first I/O device in accordance with the referred embodiment of the present invention.

FIG. 8 illustrates host device retrying an I/O read 81 to I/O device 12. I/O device 12 responds to I/O read 81 and assumes the role of target device for the transaction.

Figure 9:
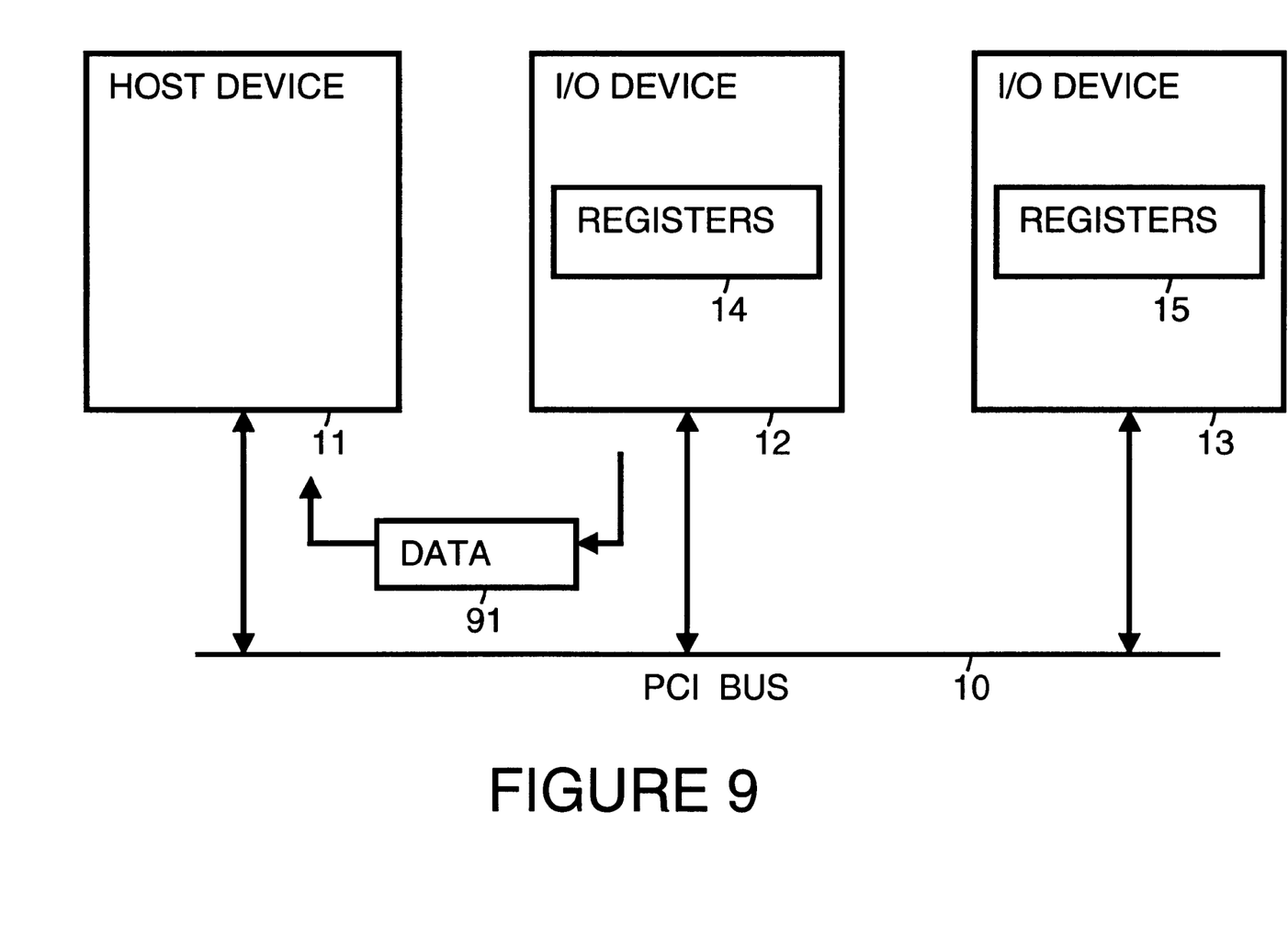
FIG. 9 is a simplified block diagram which illustrates the first I/O device sending data to the host device in accordance with the preferred embodiment of the present invention.

As illustrated by FIG. 9, I/O device 12 sends data 91 as requested by host device 11. The data reflects the contents of the addressed register both within registers 14 and within registers 15.

Figure 10:
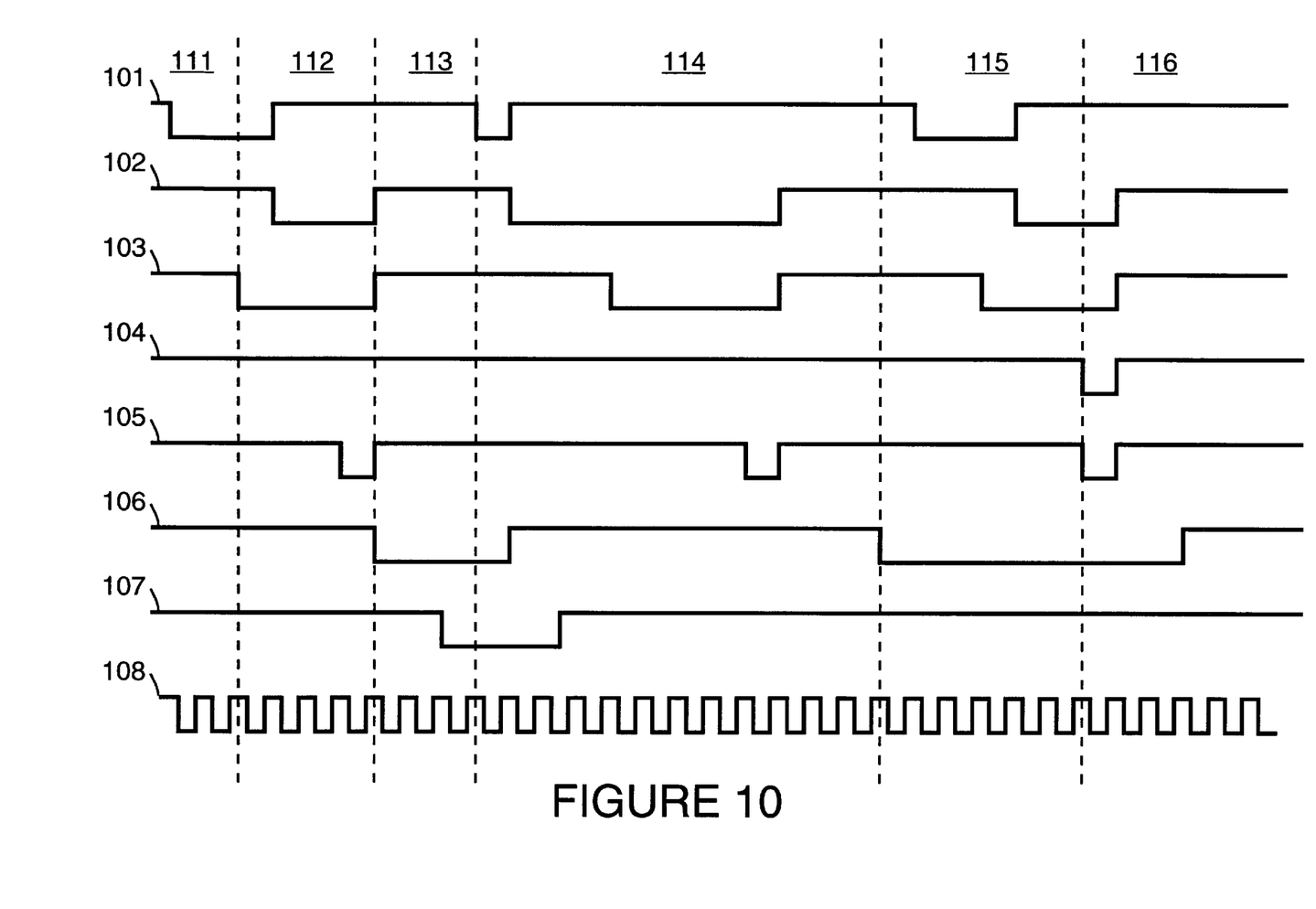
FIG. 10 is a waveform diagram which illustrates a potential problem when the second I/O device is an adaptive "DEVSEL" device.

FIG. 10 shows what can happen if I/O device 13 is an adaptive DEVSEL device, and a retry by host 11 happens at an inopportune time.

FIG. 10 shows waveform for control signals placed on control lines of PCI bus 10. A waveform 101 represents the PCI "FRAME" signal, which is active low. A waveform 102 represents the PCI "IRDY" signal, which is active low. A waveform 103 represents the PCI "DEVSEL" signal, which is active low. A waveform 104 represents the PCI "TRDY" signal, which is active low. A waveform 105 represents the PCI "STOP" signal, which is active low. A waveform 106 represents the PCI "REQ" signal, which is active low. A waveform 107 represents the PCI "GNT" signal, which is active low. A waveform 108 represents the PCI "CLK" signal.

The PCI bus additionally includes 32 address/data lines on which are placed PCI "ADDR" signals, four command lines on which are placed PCI "CMND" signals, a reset line on which is placed a PCI "RST" signal, a lock line on which is placed a PCI "LOCK" signal and an interrupt line on which is placed a PCI "INT" signal.

In a time period 111, host device 11 has asserted low FRAME signal (waveform 101). After FRAME is initially asserted low, in a time period 112, I/O device 12 asserts low DEVSEL signal (waveform 103) for two PCI bus clock cycles, assuming the role of target for the data transaction. However, at the end of time period 112, I/O device 12 asserts low the STOP signal (waveform 105) to indicate a target retry transaction to the host.

After asserting the STOP signal, I/O device 12 immediately asserts the REQ signal (waveform 106) requesting bus ownership to allow initiation of a data transaction. I/O device 12 receives a grant via GNT signal (waveform 107) in a time period 113 from host device 11.

In a time period 114, I/O device 12 releases REQ signal (waveform 106) and begins to set up a data transaction with I/O device 13. I/O device 13 asserts DEVSEL with subtractive (four PCI bus clock cycles after FRAME is initially asserted) timing to indicate I/O device 13 is the target for the data transaction. However, I/O device 13 is unable to obtain the data within the predetermined time and asserts STOP signal (waveform 105). It is noteworthy that DEVSEL response occurs in one of four categories. In the first category (Fast Timing) DEVSEL is asserted one PCI bus clock cycle after FRAME is initially asserted. In the second category (Medium Timing) DEVSEL is asserted two PCI bus clock cycles after FRAME is initially asserted. In the third category (Slow Timing) DEVSEL is asserted three PCI bus clock cycles after FRAME is initially asserted. In the fourth category (Subtractive Timing) DEVSEL is asserted four PCI bus clock cycles after FRAME is initially asserted.

In a time period 115, host 11 has retried the data transaction indicating a register address which is valid both in registers 14 of I/O device 12 and in registers 15 of I/O device 13. I/O device 12, responds after only two clock cycles to pull DEVSEL signal (waveform 103) low. Because in this case I/O device 13 is an adaptive DEVSEL device, and this is the second access of the same address, I/O device 13 also responds after only two clock cycles to pull DEVSEL signal (waveform 103) low. Now both I/O device 12 and I/O device 13 have claimed to be the target device, which is a violation of the PCI protocol.

In time period 116, I/O device 13 activates signal TRDY (waveform 104) indicating that I/O device 13 has completed the data transaction. However, simultaneously, I/O device 12 activates signal STOP (waveform 105) to stop the transaction. This is a significant error. I/O device 13 completes the transaction to the wrong initiator (host device 11) instead of to I/O device 12 resulting in corrupt (invalid) data passed to host device 11 and unpredictable state machine status in device 12.

Figure 11:
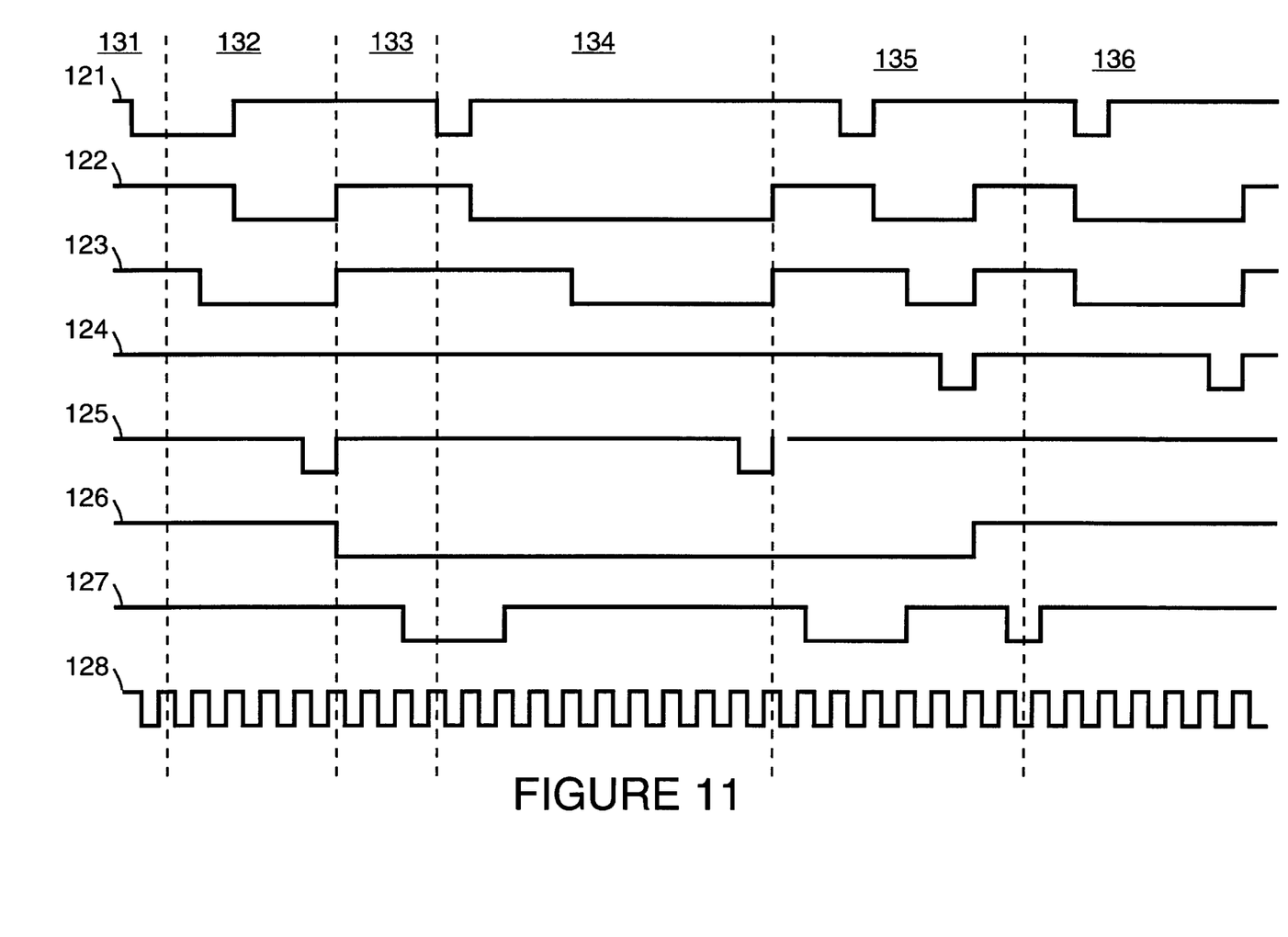
FIG. 11 is a waveform diagram which illustrates a solution to the potential problem shown in FIG. 10, in accordance with the preferred embodiment of the present invention.

FIG. 11 shows how this problem can be alleviated by I/O device 12 not releasing REQ signal until I/O device completes the data transaction with I/O device 13.

FIG. 11 shows waveform for control signals placed on control lines of PCI bus 10. A waveform 121 represents the PCI "FRAME" signal, which is active low. A waveform 122 represents the PCI "IRDY" signal, which is active low. A waveform 123 represents the PCI "DEVSEL" signal, which is active low. A waveform 124 represents the PCI "TRDY" signal, which is active low. A waveform 125 represents the PCI "STOP" signal, which is active low. A waveform 126 represents the PCI "REQ" signal, which is active low. A waveform 127 represents the PCI "GNT" signal, which is active low. A waveform 128 represents the PCI "CLK" signal.

As discussed above, PCI bus additionally includes 32 address/data lines on which are placed PCI "ADDR" signals, four command lines on which are placed PCI "CMND" signals, a reset line on which is placed a PCI "RST" signal, a lock line on which is placed a PCI "LOCK" signal and an interrupt line on which is placed a PCI "INT" signal.

In a time period 131, host device 11 has asserted low FRAME signal (waveform 121). In a time period 132, I/O device 12 asserts low DEVSEL signal (waveform 123) two PCI bus clock cycles after FRAME is initially asserted, assuming the role of target for the data transaction. However, at the end of time period 132, I/O device 12 asserts low the STOP signal (waveform 125) to target retry the transaction.

After asserting the STOP signal, I/O device 12 immediately asserts the REQ signal (waveform 126) requesting initiation of a data transaction. I/O device 12 receives a grant via GNT signal (waveform 127) from host device 11 in a time period 133.

In a time period 134, I/O device 12 does not releases REQ signal (waveform 126). This violates the PCI protocol, but prevents host 11 from obtaining bus ownership and retrying a data transaction. I/O device 12 begins to set up a data transaction with I/O device 13. However, I/O device 13 is unable to obtain the data within the predetermined time and asserts STOP signal (waveform 125).

In a time period 135, I/O device 12 retries the data transaction. Because in this case I/O device 13 is an adaptive DEVSEL device, and this is the second access of the same address, I/O device 13, responds after only two clock cycles to pull DEVSEL signal (waveform 123) low. I/O device 13 activates signal TRDY (waveform 124) indicating that I/O device 13 has completed the data transaction. I/O device 12 then releases REQ signal (waveform 126) and waits for host 11 to retry the data transaction.

In a time period 136, host device 11 has regained control of the bus and retries the initial cycle. I/O device 12 pulls DEVSEL signal (waveform 123) low in 2 PCI clock cycles assuming the role of target for the data transaction. I/O device 13 has adaptively resumed subtractive decode timing and does not claim the cycle. I/O device 12 then normally completes the original host cycle by supplying the merged I/O device 12 and I/O device 13 data to host device 11 when signal TRDY (waveform 124) is asserted low.

Figure 12:
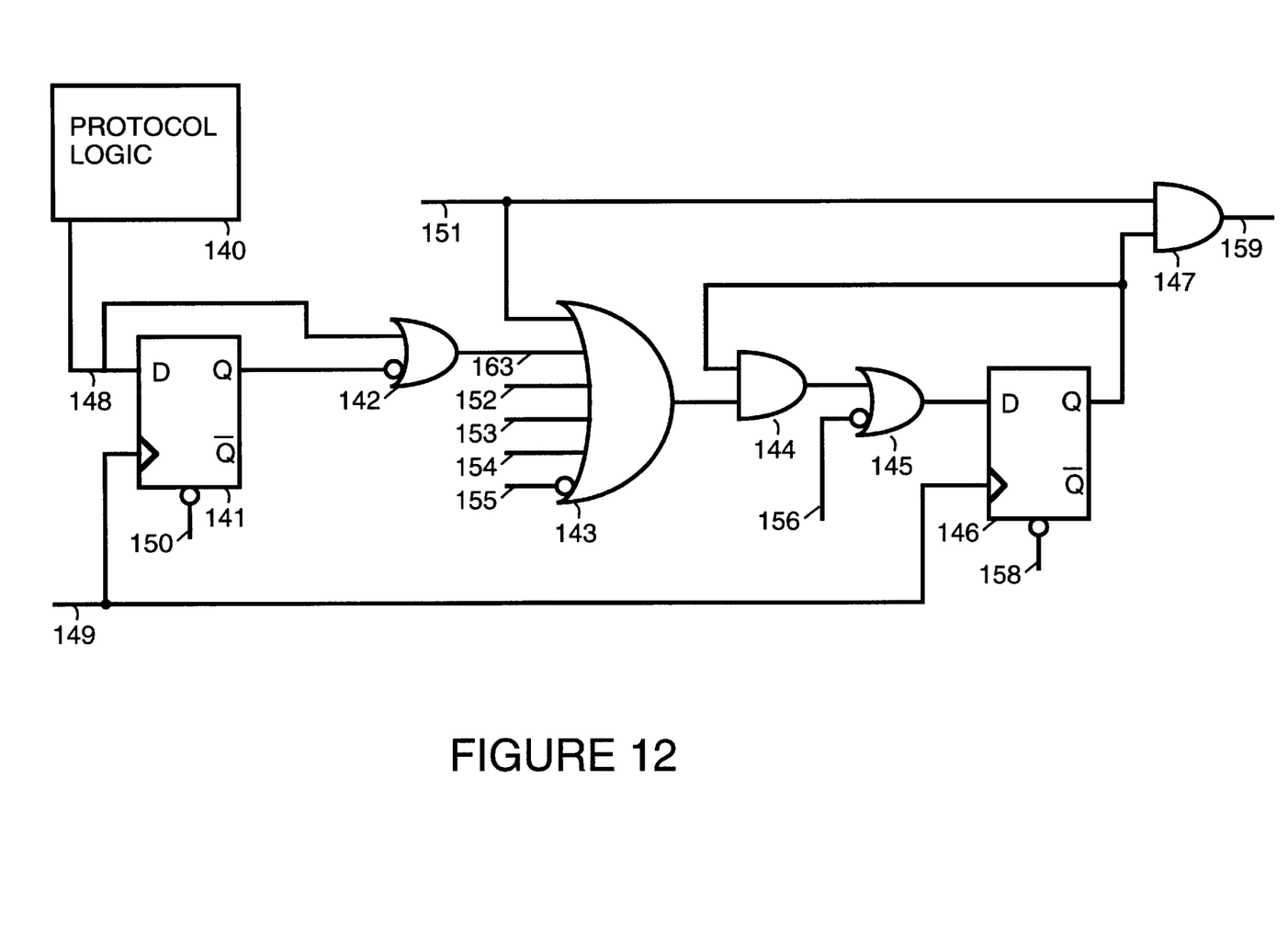
FIG. 12 is a block diagram of logic added to the first I/O device in order to effect the solution illustrated by the waveform diagram of FIG. 11, in accordance with the preferred embodiment of the present invention.

FIG. 12 shows protocol logic 140 for receiving and generating signals in accordance with the PCI protocol. In addition, FIG. 12 shows logic added to I/O device 12 in order to facilitate holding REQ signal active low during the complete data transaction. The added logic includes a delay (D) flip-flop 141, a logic OR gate 142 with output 163, a logic OR gate 143, a logic AND gate 144, a logic OR gate 145, a D flip-flop 146 and a logic AND gate 147, connected as shown. On input 151 is placed the REQ signal as is normally generated by protocol logic 140 of I/O device 12. The added logic generates a modified REQ signal on an output 159 as is required by the preferred embodiment of the present invention.

On an input 148, is placed the PCI FRAME signal. On an input 149 there is placed the PCI CLK signal. On an input 150 is placed the PCI RST signal. On a line 152 is placed the PCI GNT signal. On lines 153, 154 and 155 are placed the three highest order bits of PCI CMND signals (CBE3, CBE2 and CBE1, respectively). These three bits of PCI CMND indicate when the selected command is an I/O read or an I/O write. On a line 156 is placed the PCI TRDY signal. On a line 158 is placed the PCI RST signal.

As is seen by analysis of the logic, when I/O device 12 is the initiator of an I/O read or an I/O write, I/O device 12 holds PCI REQ active low until I/O device 12 receives the PCI TRDY signal from the target device. PCI REQ is held despite I/O device 12 receiving a PCI STOP from the target device. A PCI RST signal, however, results in I/O device 12 releasing the PCI REQ signal.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for transferring data, performed by a first input/output device in order to perform a data transaction with a host device, the method comprising the following steps:
   (a) receiving a first data transaction request from the host device;
   (b) stopping the first data transaction;
   (c) requesting a data second transaction with a second input/output device, including the following substep,
      (c.1) continuously asserting a request signal;
   (d) receiving a stop signal from the second input/output device while continuously asserting the request signal;
   (e) retrying the second data transaction with the second input/output device while continuously asserting the request signal; and,
   (f) upon completing the second data transaction with the second input/output device, releasing the request signals;
   wherein the request signal is continuously asserted without being released during performance of steps (c), (d) and (e).

2. A method as in claim 1 wherein the host device, the first input/output device and the second input/output device communicate using a Peripheral Component Interconnect (PCI) bus protocol.

3. A method as in claim 2 wherein step (b) includes the first input/output device asserting a PCI STOP signal.

4. A method as in claim 2 wherein the request signal is a PCI REQ signal and substep (c.1) includes continuously asserting the PCI REQ signal.

5. A method as in claim 2 wherein the stop signal is a PCI STOP signal and step (d) includes receiving the PCI STOP signal.

6. A method as in claim 2 wherein the request signal is a PCI REQ signal and step (d) includes continuously asserting the PCI REQ signal.

7. A method as in claim 2 wherein the request signal is a PCI REQ signal and step (e) includes releasing the PCI REQ signal.

8. A method as in claim 2 wherein the first input/output device and the second input/output device corresponding registers with a same bus address.

9. A method as in claim 2 wherein the second input/output device is an adaptive "DEVSEL" device.

10. A method as in claim 1 wherein the data transaction is an I/O read.

11. A method as in claim 1 wherein the data transaction is an I/O write.

12. An input/output device for connection to a bus and interacting with a host device and a second input/output device, the input/output device comprising:

protocol logic for receiving and generating signals in accordance with a protocol for the bus, the protocol logic controlling the input/output device receiving a first data transaction request from the host device, stopping the first data transaction, requesting a data second transaction with the second input/output device, receiving a stop signal from the second input/output device, and retrying the second data transaction with the second input/output device; and, additional logic, the additional logic for continuously asserting a request signal once the input/output device initiates the second data transaction, the additional logic not releasing the request signal until after the second input/output device completes the second data transaction.

13. An input/output device as in claim 12 wherein the host device, the input/output device and the second input/output device communicate using a Peripheral Component Interconnect (PCI) bus protocol and the bus is a PCI bus.

14. An input/output device as in claim 13 wherein the stop signal is a PCI STOP signal.

15. An input/output device as in claim 13 wherein the request signal is a PCI REQ signal.

16. An input/output device as in claim 13 wherein:

the input/output device includes first registers;

the second input/output device includes second registers; and the first registers have identical bus addresses to the second registers.

17. An input/output device as in claim 13 wherein the second input/output device is an adaptive "DEVSEL" device.

18. An input/output device as in claim 12 wherein the first data transaction is an I/O read.

19. An input/output device as in claim 12 wherein the first data transaction is an I/O write.

20. A method for transferring data, performed by a first input/output device in order to perform a data transaction with a host device using the Peripheral Component Interconnect (PCI) bus protocol, the method comprising the following steps:

(a) receiving a first data transaction request from the host device;

(b) asserting a PCI STOP signal;

(c) requesting a data second transaction with a second input/output device, the second input/output device being an adaptive DEVSEL device, the first input/output device and the second input/output device corresponding registers with a same bus address, step (c) including the following substep, (c.1) continuously asserting a PCI REQ signal;

(d) receiving a PCI STOP signal from the second input/output device while continuously asserting the PCI REQ signal;

(e) retrying the second data transaction with the second input/output device while continuously asserting the PCI REQ signal; and, (f) upon completing the second data transaction with the second input/output device, releasing the PCI REQ signals;

wherein the PCI REQ signal is continuously asserted without being released during performance of steps (c), (d) and (e).

* * * * *